US00RE36002E

United States Patent [19]

Elsby et al.

[11] E Patent Number: Re. 36,002

[45] Reissued Date of Patent: Dec. 22, 1998

[54] TRANSMISSION SLEEVE FOR A DOWN HOLE HAMMER

[75] Inventors: John Elsby, Lemming; Brian T. Sanfead, Connolly; Andrew Greathead, Woodvale, all of Australia

[73] Assignee: SDS Digger Tools PTY, Ltd., Bayswater, Australia

[21] Appl. No.: 701,542

[22] Filed: Aug. 22, 1996

Related U.S. Patent Documents

Reissue of:

[64] Patent No.: 5,154,244
Issued: Oct. 13, 1992
Appl. No.: 691,725
Filed: Apr. 26, 1991

U.S. Applications:

[63] Continuation of Ser. No. 322,981, Oct. 13, 1994.

[30] Foreign Application Priority Data

Apr. 26, 1990 [AU] Australia ..... PJ9817
Dec. 12, 1990 [AU] Australia ..... PK3850

[51] Int. Cl.[6] ..... E21B 12/00

[52] U.S. Cl. ..... 175/296; 175/414

[58] Field of Search ..... 175/293, 296, 175/307, 414, 417, 418, 325

[56] References Cited

U.S. PATENT DOCUMENTS

| | | | |
|---|---|---|---|
| 3,527,239 | 9/1970 | Boom | 173/67 |
| 3,771,612 | 11/1973 | Adock | 175/413 |
| 3,991,834 | 11/1976 | Curington . | |
| 4,321,974 | 3/1982 | Klemm . | |
| 4,706,764 | 11/1987 | Hughes | 175/320 |
| 4,765,418 | 8/1988 | Ennis . | |
| 4,836,306 | 6/1989 | Barrows | 175/321 |

FOREIGN PATENT DOCUMENTS

| | | |
|---|---|---|
| 14114 | 5/1976 | Australia . |
| 15819 | 7/1976 | Australia . |
| 52436 | 1/1986 | Australia . |
| 52436/86 | 1/1986 | Australia . |
| 58052 | 12/1986 | Australia . |
| 80143 | 10/1987 | Australia . |
| 15048 | 10/1988 | Australia . |
| 40438 | 7/1989 | Australia . |
| 42274 | 9/1989 | Australia . |
| 43643 | 10/1989 | Australia . |
| 53127 | 10/1990 | Australia . |
| 91/00146 | 4/1991 | WIPO . |

OTHER PUBLICATIONS

Exhibit of Statutory Declaration of third party alleging "Tricone Drilling System " as prior art.

PJ9682, Apr. 19, 1990 Australia (Priority for PCT 91/00146).

*Primary Examiner*—William P. Neuder
*Attorney, Agent, or Firm*—Michael N. Meller

[57] ABSTRACT

The present invention relates to a sacrificial transmission sleeve for a reverse circulation down hole hammer of the percussive type actuated by a fluid under pressure, including an outer sleeve, a drill bit retained in retaining means, the transmission sleeve comprising a body and an annular flange extending from the body towards the drill bit, wherein the transmission sleeve has an outer diameter greater than that of the outer sleeve and substantially the same as the drill bit.

6 Claims, 5 Drawing Sheets

TRANSMISSION SLEEVE FOR A DOWN HOLE HAMMER

Matter enclosed in heavy brackets [ ] appears in the original patent but forms no part of this reissue specification; matter printed in italics indicates the additions made by reissue.

*This application is a continuation of application Ser. No. 08/322,981, filed Oct. 13, 1994.*

The present invention relates to a sacrificial transmission sleeve for a reverse circulation down hole hammer of the percussive type actuated by a fluid such as compressed air. In general, in the art of reverse circulation drilling, a relatively small annular clearance, of typically 3 mm, is provided between the drill tube and the bore of the hole being drilled. The clearance must be kept relatively small so that air preferentially travels around the drill bit and forces the rock cuttings from the bottom of the hole through a passageway in the drill itself and the drill string to the surface by the action of compressed air exhausted around the sides of the drill bit and at the face of the bit. To further minimise leakage of air and/or rock cuttings into the annular space, the exhaust ports at the sides of the drill bit, and the drive sub or chuck must be adapted so as to direct air to the face of the bit. A further requirement of reverse circulation drilling is maximise the recovery of rock sample from the bottom of the hole. This aim is achieved in practice by having the maximum outside diameter of the drill bit as close as possible to the maximum outside diameter of the drill tube. However, as the cutting face of the drill bit bores out the hole, it wears down and becomes smaller in diameter. When the diameter of the drill bit approaches that of the drill tube, the drill bit would normally be replaced to prevent damage to the drill tube occurring through contact between the drill tube an the wall of the hole.

If a drill bit is used with a maximum outside diameter greater than that of the drill tube, the clearance between the drill tube and the bore of the hole is increased. This type of arrangement leads to longer bit life but increases the leakage of air into the annular clearance, reduces the rate of sample recovery and results in higher sample contamination. To overcome the loss of air and sample, attempts have been made to divert pressured air downwardly into the annular clearance. Such attempts have not been entirely successful as they have served to reduce the pressure differential across the hammer through increased air consumption, with a resulting loss in blow energy. In Australian Patent Application No. 43643/89 in the name of the present applicant, there is described a compensating ring for a down hole hammer which was proposed to solve the above mentioned problems. The sacrificial compensating ring is fitted at the base of the outer sleeve between the outer sleeve and the drive sub and has an outer diameter greater than that of the outer sleeve and substantially the same as the drill bit. The sacrificial compensating ring has similar wear characteristics to the drill bit and so wears down at a similar rate to the drill bit. The present invention provides an alternative to the invention of the above-mentioned patent application. The sacrificial transmission sleeve of the present invention is designed to provide an effective seal between the bore of the hole and the drill tube and to wear down at a similar rate to the drill bit thus maintaining the seal throughout the lifetime of the drill bit. The seal created by the transmission sleeve of the present invention permits an acceptable sample recovery rate to be maintained without either increased sample contamination or increased air consumption. Further, the sacrificial transmission sleeve of the present invention allows the use of larger drill bits for a given diameter drill tube than would otherwise be the case.

Sacrificial in the context of the present invention means that the transmission sleeve is intended to be consumed in drilling much the same way as the drill bit is.

In accordance with one aspect of the present invention there is provided a sacrificial transmission sleeve for a reverse circulation down hole hammer of the percussive type actuated by a fluid under pressure, including an outer sleeve, a drill bit retaining means held in the outer sleeve, and a drill bit retained in the retaining means and extending forwardly therefrom, the transmission sleeve comprising a body and an annular flange, the body being formed of a first inner surface and a second outer surface, the diameter of the second outer surface being greater than that of the outer sleeve and substantially the same as that of the drill bit, the transmission sleeve being shaped for location between the outer sleeve and the drill bit retaining means such that they are longitudinally spaced apart, the annular flange being of diameter substantially the same as the drill bit and extending longitudinally from the body towards the drill bit.

In accordance with a second aspect of the present invention there is provided a modification of the invention defined in the preceding paragraph, in which the sacrificial transmission sleeve and the outer sleeve are integrally formed with one another.

In accordance with a third aspect of the present invention there is provided a further modification of the invention defined in the paragraph before last, in which the sacrificial transmission sleeve and the drill bit retaining means are integrally formed with one another.

In accordance with another aspect of the present invention there is provided a reverse circulation down hole hammer of the percussive type actuated by a fluid under pressure comprising a drill bit retained by retaining means, the retaining means being held in an outer sleeve and a sacrificial transmission sleeve in accordance with the present invention located longitudinally intermediate the outer sleeve and the drive sub.

The present invention will now be described, by way of example, with reference to the accompanying drawing, in which.

Figure 6:
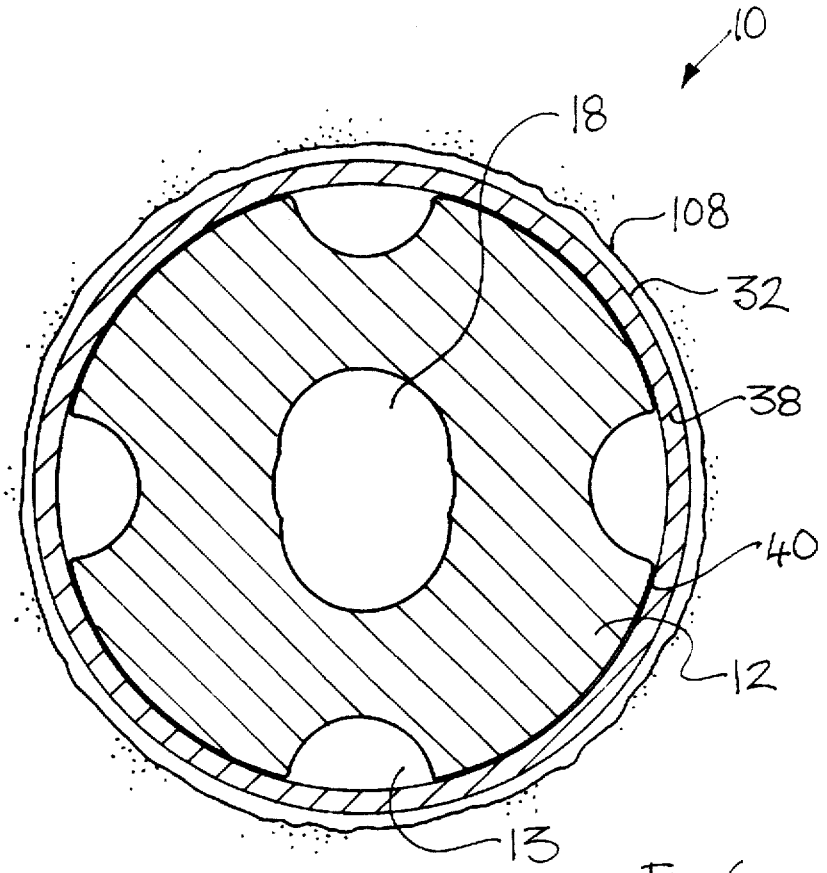
FIG. 6 is a cross-sectional view taken along the line 6—6 of FIG. 1.

Shown in FIGS. 1, 4, 5 and 6 is a down hole hammer 10 comprising a drill bit 12 having air pas&ages 13, a cutting face 14 and a plurality or apertures 16 extending into a central aperture 18. The drill bit 12 is retained in a drive sub 20 by slip split rings 22 and splines 23 which are dimensioned so as to allow for exhaust air passages 13 between the drill bit 12 and the drive sub 20 in known manner. The drive sub 20 is held in an outer sleeve 24 typically by way of a threaded portion 26 of the outer sleeve 24. The outer sleeve 24 surrounds porting means (not shown) of known type to enable a piston (not shown) to reciprocally strike the bit 12 in known manner. The exhaust air passages 13 can be seen clearly in the cross sectional views of FIGS. 4, 5 and 6. The drill bit 12 is dimensioned such that it is freely able to move within the drive sub 20. Thus, the air passages 13 are in fluid communication with one another. As shown in FIG. 6 towards the face 14 of the drill bit 12 the number of exhaust air passages is reduced. The surface area of the face 14 of the drill bit 12 may thus be increased and a greater number of drilling studs attached to the face 14. Longitudinally intermediate of the outer sleeve 24 and the drive sub 20 is a sacrificial transmission sleeve 28 having a body 29 comprising a first inner surface 30 substantially conforming to the drive sub 20 and a second outer surface 32.

The body 29 further comprises a base 34 extending transversely to a longitudinal axis of the down hole hammer 10, and a bevel 36 inclined to a longitudinal axis of the down hole hammer 10 (and hence to the axis of the transmission sleeve 28). Typically, such inclination is of the order of 15°. As shown the bevel 36 tapers inwardly so that the upper end of the outer surface 32 is flush with the outer sleeve 24. As may also be seen, the body 29 is partially proud of the outer sleeve 24.

Preferably, the diameter of the transmission sleeve 28, as measured at the body 29 below the bevel 36, is substantially the same as that of the drill bit 12. The transmission sleeve 28 further comprises an annularflange 38 extending from the body 29 of the transmission sleeve 28 towards the drill bit 12. The flange 38 is disposed with an interior surface 40 overlying the drive sub 20 extending beyond the drive sub 20 towards the drill bit 12.

The flange 38 preferably has a diameter substantially the same as that of the second outer surface 32. The flange 38 typically has no mechanical interference or location with the drive sub 20 or the drill bit 12. The body 29 is typically about 25 mm long measured in the longitudinal direction of the down hole hammer 10. The flange 38 is typically about 85 mm long measured in the longitudinal direction of the down hole hammer 10.

The flange 38 is adapted to encircle a portion of the drill bit which defines longitudinal grooves forming the exhaust air passages 13 in the sides of the bit in such a manner as to form a continuous shroud around at least a part of the grooves so as to assist in the downward passage of the exhaust air to the face of the drill bit 12. This is shown clearly in FIG. 6.

The transmission sleeve 28 of the present invention serves to provide a more effective seal with the hole 108 than the compensating ring of our earlier Australian Patent Application No. 43643/89, as it seals the hole 108 closer to the face 14 of the drill bit 12. Further, the flange 38 allows the seal to be maintained over a longer length. This reduces the chances of sample contamination and/or increased air consumption.

As can be seen from FIG. 6 the flange 38 of the transmission sleeve 28 surrounds the air exhaust ports 13. Air travelling through the exhaust port is thus released closer to the face 14 of the drill bit 12. This results in an improved sample recovery rate.

Typically, the transmission sleeve 28 has initially an outside diameter about 3 mm smaller (0.125 inches) than the diameter of the drill bit 12 so as to avoid drag otherwise caused by the transmission sleeve 28 at the outset of drilling.

Typically, the transmission sleeve 28 is made of a heat treated alloy steel with a hardness similar to the outer sleeve 24 out softer than the drive sub 20. The wear characteristics of the transmission sleeve 28, are preferably similar to those of the drill bit 12.

Figure 2:
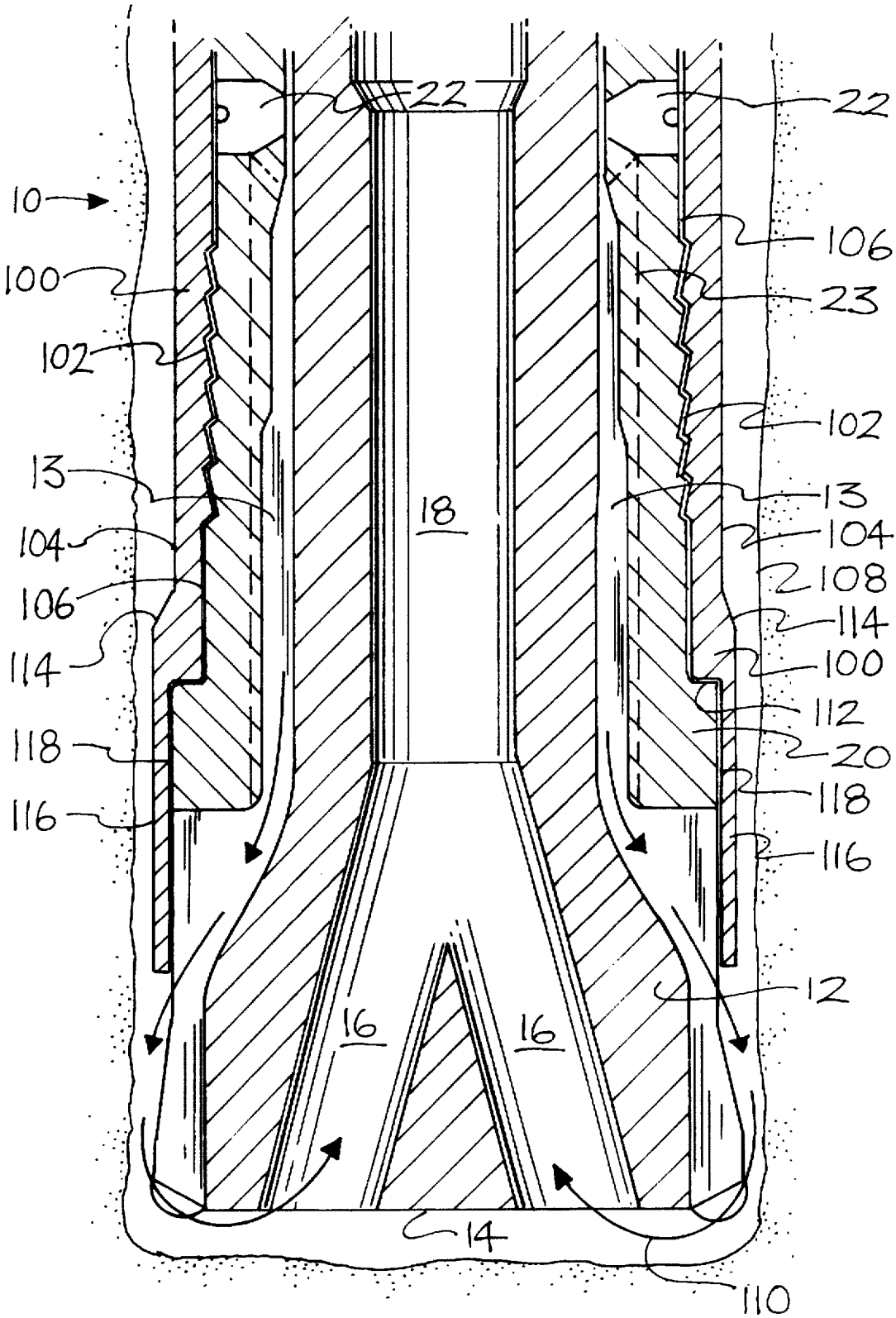
FIG. 2 is a sectional side view of a reverse circulation down hole hammer incorporating a sleeve in accordance with a second embodiment of the present invention.
Figure 3:
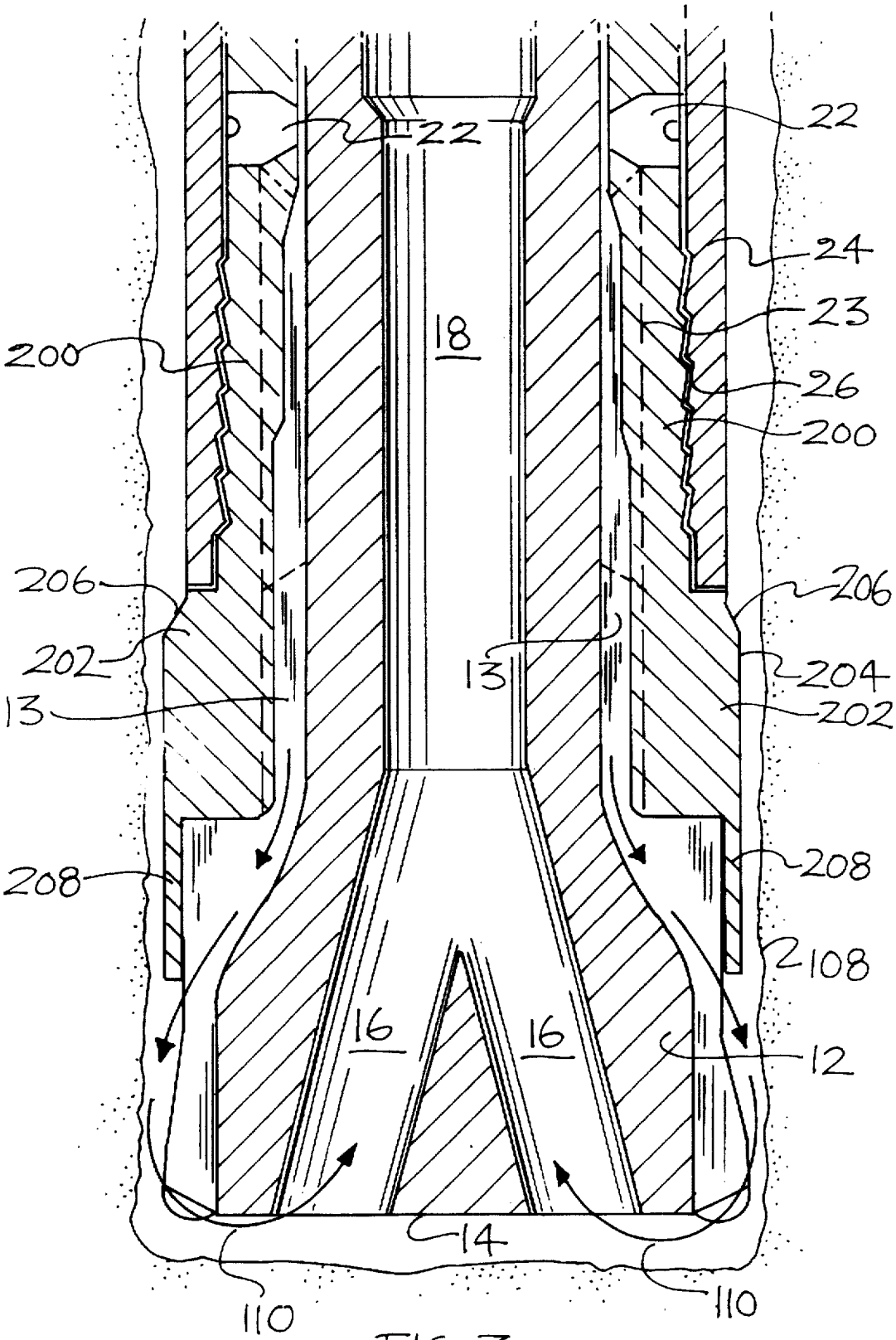
FIG. 3 is a sectional side view of a down hole hammer incorporating a sleeve in accordance with a third aspect of the present invention.
Figure 4:
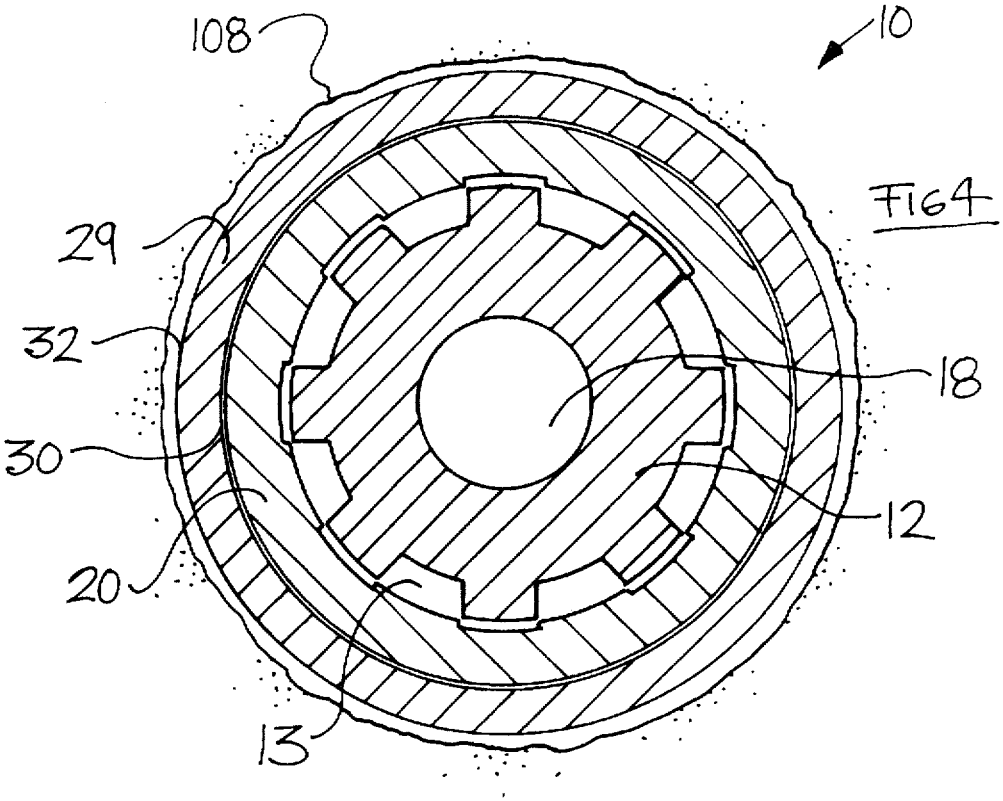
FIG. 4 is a cross-sectional view taken along the line 4—4 of FIG. 1.
Figure 5:
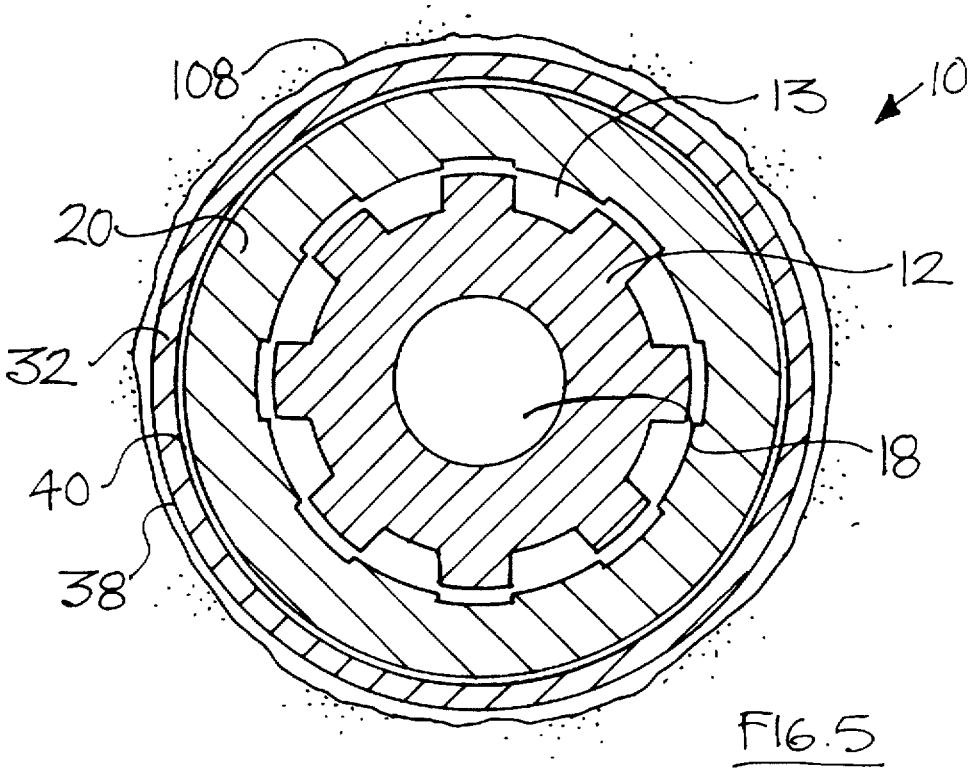
FIG. 5 is a cross-sectional view taken along the line 5—5 of FIG. 1.

FIGS. 2 and 3 illustrate second and third embodiments of the present invention respectively. The outward appearance of the hole hammer 10 containing the second and third embodiments is substantially identical to the above described first embodiment and like reference numerals are used to identify like features.

The hole hammer 10 illustrated in FIG. 2 is held in a sleeve 100. The sleeve 100 may be considered to be a composite of the outer sleeve 24 and transmission sleeve 28 of the first described embodiment in that the outer sleeve 24 and transmission sleeve 28 are integrally formed with one another to form the sleeve 100.

The sleeve 100 extends around the drill bit 12 and is retained on the drive sub 20 by a threaded portion 102 on the inner surface of the sleeve.

The sleeve 100 has a first outer surface 104 and a second inner surface 106 and a base 112. The inner surface 106 conforms substantially to the drive sub 20.

The outer surface 104 has a bevel 114 inclined to a longitudinal axis of the down hole hammer 10. The bevel 114 increases the diameter of the sleeve 100 to approximately the diameter of the drill bit 12. An annular flange 116 extends from the base 112 of the sleeve 100. The flange 116 is disposed with an interior surface 18 overlying the drive sub 20 extending beyond the drive sub 20 towards the drill bit 12.

The dimensions of the sleeve 100 corresponds to those of the outer sleeve 24 and transmission sleeve 28.

FIG. 3 illustrates a third embodiment of the present invention. The drill bit 12 is retained in a drive sub 200. The drive sub 200 is retained in the outer sleeve 24 by the threaded portion 26.

Below the outer sleeve 24 the drive sub 200 is widened to form a body 202 (in that the drive sub 20 and the transmission sleeve 28 are integrally formed with one another. The body 202 is partially proud of the outer sleeve 24 and has an outer surface 204. The outer surface 204 of the body 202 has an inclined bevel 206. As shown, the bevel 206 tapers inwardly so that the upper end of the outer surface 204 is flush with the outer sleeve 24. The bevel 206 increases the diameter of the body 202 to the diameter of the drill bit 12.

Extending from the body 202 towards the drill bit 12 is an annular flange 208. The annular flange 208 extends from a base 210 of the body 208.

Figure 1:
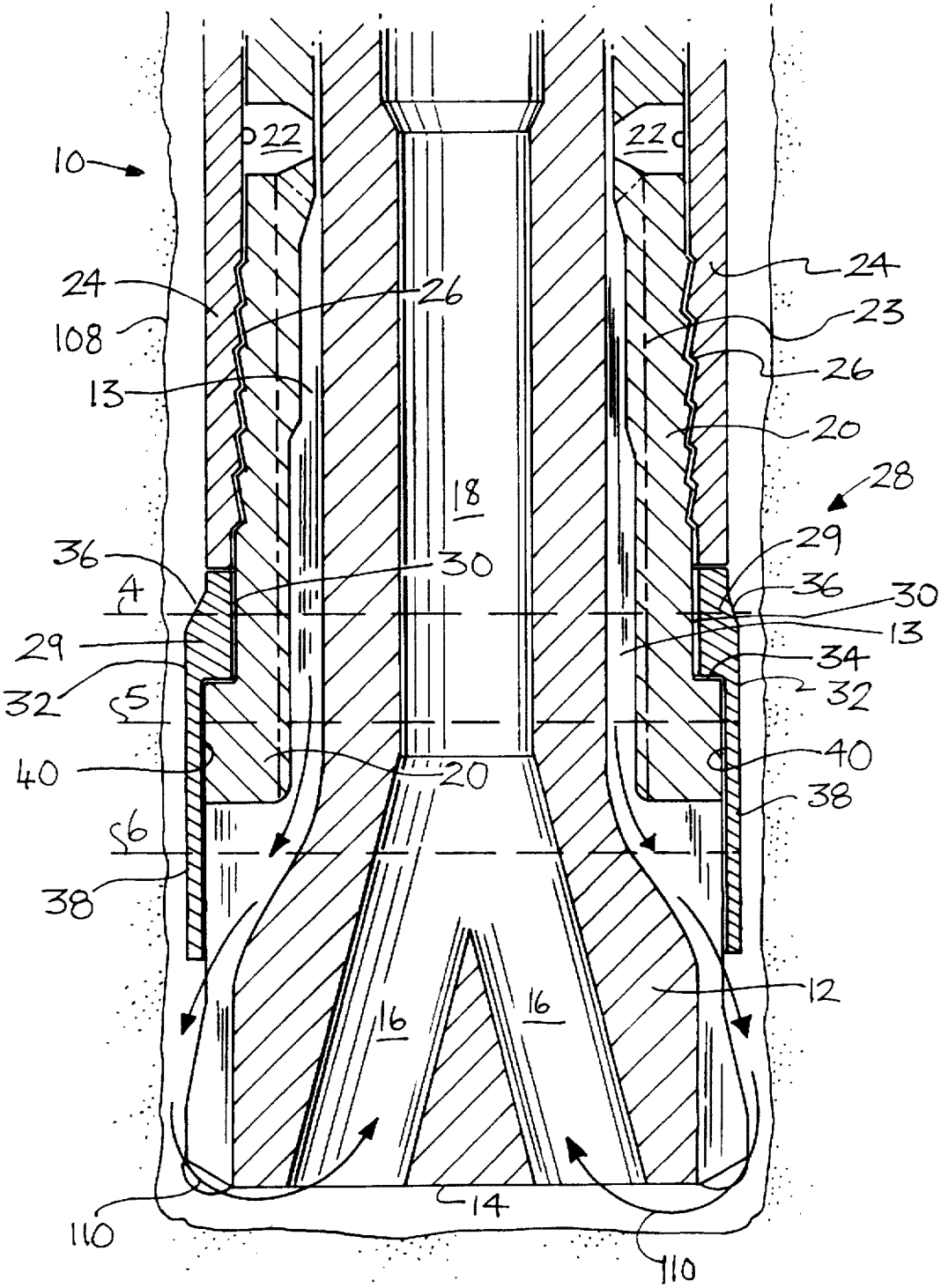
FIG. 1 is a sectional side view of a reverse circulation down hole hammer incorporating a sacrificial transmission sleeve in accordance with a first embodiment of the present invention.

The drive sub 200 has dimensions which correspond to those of the drive sub 20 and transmission sleeve 28 shown in FIG. 1.

The operation of the present invention will now be described with reference to the first embodiment. It is to be understood that the operation of the second and third embodiments may be effected in a similar manner.

The transmission sleeve 28, is placed on the drive sub 20 and the drive sub 20 is tightly threaded onto the threaded portion 26 of the outer sleeve 24. The bevel 36 is uppermost and provides a taper to the outer sleeve 24. The down hole hammer 10 with the transmission sleeve 28 fitted is then drilled, drill bit 12 first, to form a hole 108 or inserted, drill bit 12 first, into the hole 108. The down hole hammer 10 is operated in known manner and the cutting face 14 produces rock chips. Compressed air passes outer of the down hole hammer 10, shown by arrows 110, and carries the rock chips through the apertures 16, into the central aperture 18 and thence to be recovered. The annular flange 38, 116, 208 causes the air to be released from the hammer 10 closer to the percussion bit strike face 14 than prior art devices. The leakage of air to the ground being drilled through the side wall of the hole 108 and past the outer sleeve is minimised and loss of drill cuttings is reduced.

The flange 38, 116, 208 of the transmission sleeve 28, 100, 200 is close to or in contact with the bore of the hole 108 and thus presents a substantially positive barrier or seal to the leakage of air. Rock chips carried by air thus tend not to pass the barrier or seal and thus are unlikely to contact the outer sleeve 24. This is particularly true of shallow holes 108 and of relatively soft ground. Hence, wear of the outer sleeve 24 is reduced.

The outer sleeve 24 surrounds porting means for the hammer 10 and is very expensive compared to the drill bit. A large annular clearance between the outer sleeve 24 and the bore of the hole 108 is able to be used as a result of this substantially positive barrier and so the outer sleeve 24 is better protected from wear. The drill bit 12 is able to be re-ground more times, thereby increasing bit life. The incidence of wearing of the drive sub 20 is also reduced. In the case of the second embodiment as the sleeve 100 is worn, the whole of the sleeve 100 will have to be replaced. Similarly, as the flange 208 of the drive-sub 200 of the third embodiment is worn the drive sub 200 will require to be replaced in its entirety. Thus, it can be seen that the first embodiment of the present invention is to be preferred over the second and third embodiments. The inclined bevel 36 directs rock chips away from the sleeve 24 when the down hole hammer 10 is removed from the hole 108 and thereby reduces the likelihood of catching or jamming of the down hole hammer 10 in the hole 108. Preferably, as in the first embodiment of the present invention, the transmission sleeve 28 is not threaded or otherwise fixed onto the drive sub 20 or the outer sleeve 24 (in the case of the latter). This is because difficulties in tightening and loosening of the drive sub 20, transmission sleeve 28 and outer sleeve 24 could occur if it was so fixed.

The present invention enables a larger drill bit to be used whilst still maintaining an acceptable barrier or seal against air leakage between the outer sleeve 24 and the hole 108. Bit life is increased and wear of the outer sleeve 24 and the drive sub 20 is decreased. Also, a greater return of sample chips via the central aperture 18 is achieved.

The transmission sleeve 28 of the present invention is a relatively inexpensive, relatively short life, sacrificial element to protect and prolong the life of the down hole hammer 10 adjacent the drill bit 12 and achieves good sealing between the hole and the drive sub 20 to attain better collection of chippings and less contamination thereof and reduces loss of chippings between the down hole hammer 10 and the hole 108.

Modifications and variations such as would be apparent to a skilled addressee are deemed within the scope of the present invention.

We claim:

1. A sacrificial transmission sleeve for a reverse circulation down hole hammer of the percussive type actuated by a fluid under pressure, including an outer sleeve, a drill bit retaining means held in the outer sleeve, and a drill bit retained in the retaining means and extending forwardly therefrom, a portion of the drill bit provided with longitudinal grooves forming exhaust passages for the fluid, the transmission sleeve comprising a body and an annular flange, the body being formed of a first inner surface and a second outer surface, the diameter of the second outer surface being greater than that of the outer sleeve and substantially the same as that of the drill bit, [the transmission sleeve being shaped for location between the outer sleeve and the drill bit retaining means such that they are longitudinally spaced apart,] the annular flange being of a diameter substantially the same as the drill bit and extending from the body towards the drill bit, the annular flange also being configured to encircle the portion of the drill bit provided with the longitudinal grooves to form a continuous shroud around at least a part of the grooves so as to assist in the downward passage of exhaust fluid to a face of the drill bit.

2. A sacrificial transmission sleeve for a reverse circulation down hole hammer according to claim 1, in which the transmission sleeve and the outer sleeve are integrally formed with one another.

3. A sacrificial transmission sleeve for a reverse circulation down hole hammer according to claim 1, in which the transmission sleeve end the drill bit retaining means are integrally formed with one another.

4. A sacrificial transmission sleeve for a reverse circulation down hole hammer according to claim 1, which is formed of heat treated alloy steel with a hardness similar to the outer sleeve but softer than the drill bit retaining means.

5. A sacrificial transmission sleeve for a reverse circulation down hole hammer according to claim 1, which has wear characteristics similar to the drill bit.

6. A reverse circulation down hole hammer of the percussive type actuated by a fluid under pressure comprising *an outer sleeve, a drill bit retaining means held in the outer sleeve,* a drill bit retained by [a] *said* drill bit retaining means[.] *and having a section extending forwardly therefrom, a portion of* the drill bit provided with longitudinal grooves forming exhaust passages for the fluid[, the retaining means being held in an outer sleeve] and a sacrificial transmission sleeve *comprising a body and an annular flange with the body* located [longitudinally between] *in substantial longitudinal alignment with* the outer sleeve [and the drill bit retaining means, the sacrificial transmission sleeve comprising a body and an annular flange, the body] *and* being formed of a first inner surface and a second outer surface, the diameter of the second outer surface being greater than that of the outer sleeve and substantially the same as that of the drill bit, [the transmission sleeve being shaped for location between the outer sleeve and the drill bit retaining means such that they are longitudinally spaced apart,] the annular flange being of a diameter substantially the same as the drill bit and extending from the body towards the *forwardly extending section of the* drill bit[.] *with* the annular flange being configured *in said forwardly extending section* to encircle the portion of the drill bit provided with the longitudinal grooves to form a continuous shroud around at least a part of the grooves so as to assist in the downward passage of the exhaust fluid to a face of the drill bit.

* * * * *